(12) United States Patent
Underhill

(10) Patent No.: US 12,738,583 B2
(45) Date of Patent: Sep. 15, 2026

(54) HANDLE FOR A LITHIUM ION BATTERY

(71) Applicant: The Noco Company, Glenwillow, OH (US)

(72) Inventor: Derek Michael Underhill, Tempe, AZ (US)

(73) Assignee: The Noco Company, Glenwillow, OH (US)

( * ) Notice: Subject to any disclaimer, the term of this patent is extended or adjusted under 35 U.S.C. 154(b) by 628 days.

(21) Appl. No.: 18/323,781

(22) Filed: May 25, 2023

(65) Prior Publication Data

US 2024/0396146 A1 Nov. 28, 2024

(51) Int. Cl.

| | |
|---|---|
| ***H01M 50/00*** | (2021.01) |
| ***H01M 10/0525*** | (2010.01) |
| ***H01M 10/058*** | (2010.01) |
| ***H01M 50/244*** | (2021.01) |
| ***H01M 50/567*** | (2021.01) |
| ***H01M 50/591*** | (2021.01) |

(52) U.S. Cl.

CPC ..... *H01M 50/244* (2021.01); *H01M 10/0525* (2013.01); *H01M 10/058* (2013.01); *H01M 50/567* (2021.01); *H01M 50/591* (2021.01)

(58) Field of Classification Search

CPC ........... H01M 50/244; H01M 10/0525; H01M 10/058; H01M 50/567; H01M 50/597; Y02E 60/10

See application file for complete search history.

(56) References Cited

U.S. PATENT DOCUMENTS 3,226,148 A 12/1965 Wiora
3,865,419 A * 2/1975 Bowers ............... H01M 50/256 294/903
4,645,725 A 2/1987 Kump et al.
5,283,137 A 2/1994 Ching
7,836,556 B1 11/2010 Medeiros
8,945,763 B2 2/2015 Tyler et al.
2016/0226054 A1* 8/2016 Kusama ................ H01M 50/55
2023/0054685 A1* 2/2023 Lelli ................. H01M 10/0585

FOREIGN PATENT DOCUMENTS

CN 213124629 U * 5/2021
CN 115693007 A * 2/2023
DE 102021127671 A1 * 6/2022 ............. H01R 13/46

(Continued)

OTHER PUBLICATIONS

大湊 清治 Battery Suspension, May 1994, See the Abstract. (Year: 1994).*

(Continued)

*Primary Examiner* — Tiffany Legette
*Assistant Examiner* — Monique M Wills
(74) *Attorney, Agent, or Firm* — Jones Day

(57) ABSTRACT

The present disclosure relates to a battery handle that is removably attachable to a battery. The handle may comprise a body comprising first end, a second end opposite the first end, and a grip portion extending between the first end and the second end in a first direction, wherein the body is removably attachable to the battery via at least one battery terminal, and the at least one battery terminal is configured to be in electrical connection with the battery.

15 Claims, 12 Drawing Sheets

(56) References Cited

FOREIGN PATENT DOCUMENTS

| | | | | | |
|---|---|---|---|---|---|
| JP | H0639623 U | * | 5/1994 | | |
| WO | WO-2015153628 A1 | * | 10/2015 | ........... | A45F 5/1516 |

OTHER PUBLICATIONS

Rangi et al., Alignment Assembly For Head Clamps, Jun. 2022, See the Abstract. (Year: 2022).*

Chen et al., Power Supply Box Handle Of Uninterrupted Power Supply, May 2021, See the Abstract. (Year: 2021).*

Gallup et al., Bendable Strap With Detachable Accessory, Oct. 2015, See the Abstract. (Year: 2015).*

Chen et al., Assembling Structure of Storage Battery Leading-out Terminal And Storage Battery, Feb. 2023, See the Abstract. (Year: 2023).*

Patent Cooperation Treaty, PCT/US2024/026408, International Search Report and Written Opinion, Sep. 18, 2024.

* cited by examiner 710
720
725
730

130D
130B
110
905B
130A
130C
100
905A

HANDLE FOR A LITHIUM ION BATTERY

TECHNICAL FIELD

The technology described herein relates generally to the field of batteries, and more specifically, to handles for carrying and maneuvering batteries.

BACKGROUND

Batteries with large capacities are traditionally bulky and difficult to maneuver. Even secondary batteries such as lithium ion batteries, increasingly used to power vehicles and small crafts, may be heavy and hard to transport. To alleviate this burden, batteries may be packaged with handles or grips. Conventional solutions, however, typically fail to provide enough support, leading to broken handles and dropped batteries. Additionally, these solutions waste packaging space, requiring larger products and higher manufacturing costs.

SUMMARY

In one aspect, a handle for a battery comprises a body comprising a first end, a second end opposite the first end, and a grip portion extending between the first end and the second end in a first direction, wherein the body is removably attachable to the battery via at least one battery terminal, and the at least one battery terminal is configured to be in electrical connection with the battery.

According to an embodiment, the at least one battery terminal comprises a plurality of terminals including a first terminal and a second terminal, wherein the first terminal is configured to connect to a first polarity of the battery through the first end of the body, and the second terminal is configured to connect to a second polarity of the battery through the second end of the body.

According to a further embodiment, the battery further comprises a plurality of protective caps configured to cover the plurality of terminals.

In accordance with a further embodiment, the first end and the second end each comprise a bottom portion having a hole, wherein the hole is configured to receive a terminal of the plurality of terminals.

In accordance with a further embodiment, the bottom portions extend in the first direction and in a second direction perpendicular to the first direction, wherein the first end and the second each further comprise a first vertical extension and a second vertical extension spaced apart from the first vertical extension in the second direction by a gap, and the hole overlaps the gap.

According to a further embodiment, the plurality of terminals comprise a first threaded portion configured to connect to the battery through the hole, a second threaded portion configured to connect to an external module, and a central nut portion having a wider width in the second direction than the first threaded portion and the second threaded portion, wherein a first portion of the gap separates the first vertical extension and the central nut portion, and a second portion of the gap separates the second vertical extension and the central nut portion.

According to a further embodiment, the handle further comprises a plurality of protective caps configured to cover the plurality of terminals, wherein the plurality of protective caps cover the second threaded portion and the central nut portion.

In accordance with an embodiment, the body comprises a recess shaped and sized to store a tool.

In accordance with a further embodiment, the handle further comprises a tool within the recess in the body, the tool comprising a wrench configured to attach and detach the plurality of terminals to the battery.

In accordance with an embodiment, the body comprises a rigid body.

In another aspect, a battery comprises a top face comprising a first set of terminal inputs and a second set of terminal inputs, and a handle removably attached to the battery, wherein a position of the handle is adjustable such that it is attached to the first set of terminal inputs in a first position, and attached to the second set of terminal inputs in a second position.

According to a further embodiment, the top face extends in a first direction and a second direction perpendicular to the first direction, wherein the first set of terminal inputs are arranged in a middle of one of the first direction and the second direction, and the second set of terminal inputs are arranged in an outside portion of the one of the first direction and a second direction.

In accordance with a further embodiment, the handle is in the first position.

In accordance with another embodiment, the handle is in the second position.

According to an embodiment, the handle comprises a first end, a second end opposite the first end, and a grip portion extending between the first end and the second end in a first direction, the first end comprising a first base having a first hole, a first vertical wall, a second vertical wall separated from the first vertical wall in a second direction perpendicular to the first direction by a first gap, and a first inclined wall between the first vertical wall and the second vertical wall in the second direction and inclined towards the grip portion, the second end comprising a second base having a second hole, a third vertical wall, a fourth vertical wall separated from the third vertical wall in the second direction a second gap, and a second inclined wall between the third vertical wall and the fourth vertical wall in the second direction and inclined towards the grip portion.

In accordance with a further embodiment, the first set of terminal inputs and the second set of terminal inputs are spaced apart in the second direction, the first set of terminal inputs comprising a first positive polarity input and first negative polarity input spaced apart in the first direction by a first distance, the second set terminal inputs comprising a second positive polarity terminal and a second negative polarity terminal spaced apart in the first direction by the first distance, and wherein the first hole and the second hole of the handle are spaced apart in the first direction by the first distance.

According to an embodiment, the handle is attached to the first set of terminal inputs or the second set of terminal inputs via a plurality of battery terminals.

In accordance with a further embodiment, the terminal inputs comprise threaded sidewalls and the plurality of battery terminals comprise a first threaded portion configured to interface with the threaded sidewalls, a second threaded portion, and a central nut portion having a wider width than the first threaded portion and the second threaded portion, and the battery further comprises a plurality of protective caps configured to cover the plurality of terminals, wherein the plurality of protective caps cover the second threaded portion and the central nut portion.

In another aspect, a method of assembling a battery package comprises receiving a battery, wherein the battery comprises a top face including a first set of terminal positions and a second set of terminal positions, receiving a handle, wherein the handle is removably attachable to the battery, and attaching the handle to the battery, wherein the handle is attached to the first set of terminal positions or the second set of terminal positions.

In accordance with an embodiment, the handle is attached via battery terminals.

BRIEF DESCRIPTION OF THE DRAWINGS

Aspects of the present disclosure are best understood from the following detailed description when read with the accompanying figures.

DETAILED DESCRIPTION

Figure 1:
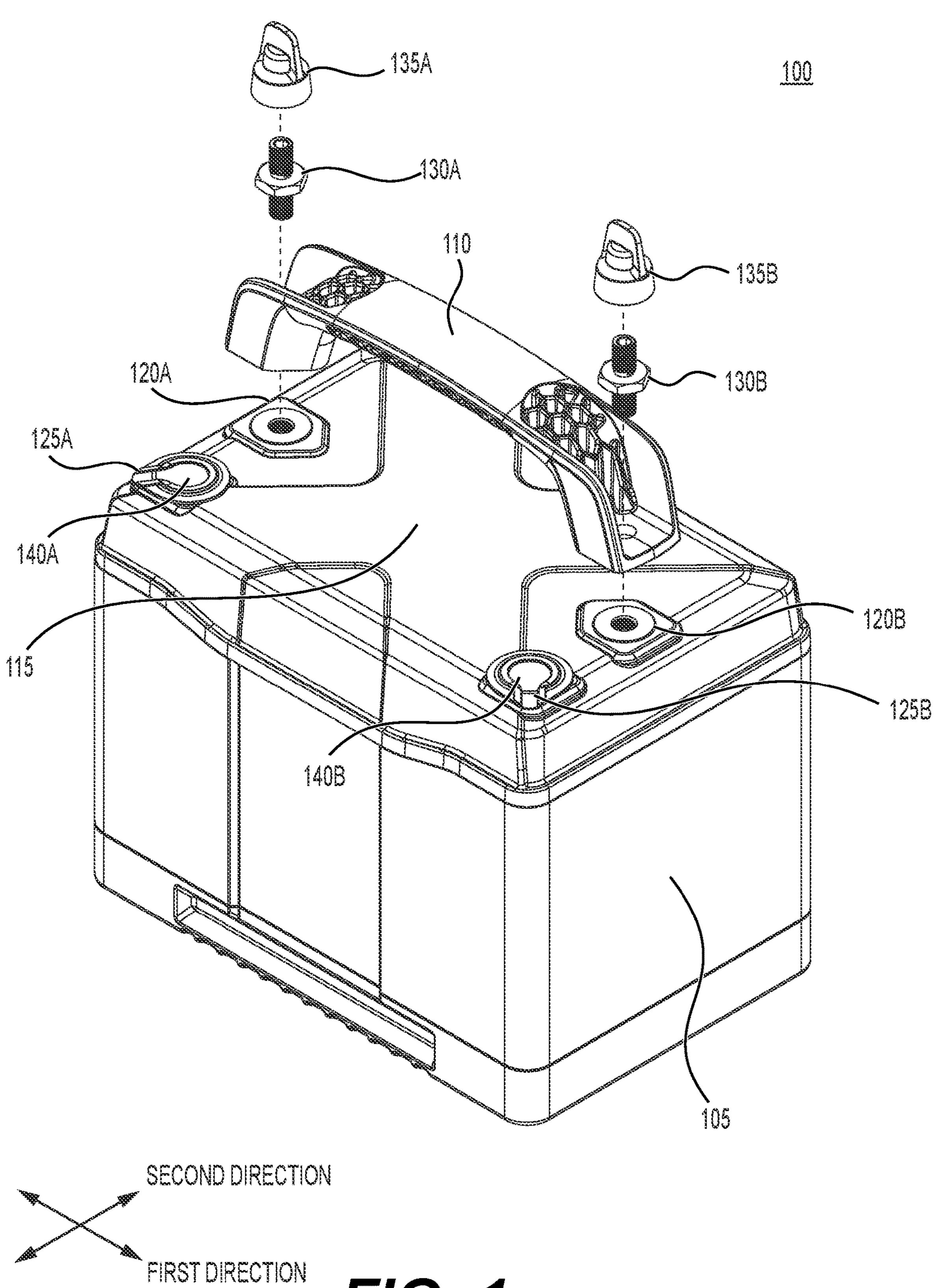
FIG. 1 is a diagram depicting a perspective view of a battery assembly including a handle for the battery according to an embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

It is generally the object of the present subject matter to provide a strong and reliable battery handle without increasing battery size or cost. The embodiments described herein relate to a handle that is removably attachable to a battery. The handle may provide a sturdy means for transporting and maneuvering a battery without requiring extra packaging space for a molded handle or a cavity for housing such a handle. Additionally, the handle may be attached in various positions, providing a convenient and easy to use handle in variety of different circumstances. In embodiments of the present subject matter, the handle may be attached to a battery via battery terminals. This further preserves space on the device, limits the number of parts required for operating the battery, decreases the risk of losing the pieces used to attach the handle to the battery.

FIG. 1 is a diagram depicting a perspective view of a battery assembly 100 including a handle 110 for the battery according to an embodiment. The battery assembly may include a battery having a body 105 and a top face 115. The top face 115 may extend in a first direction and a second direction, as depicted by the axes in FIG. 1.

The top face of the battery may comprise multiple sets of terminal positions. For example, in the embodiment depicted in FIG. 1, top face 115 includes a first set of terminal positions 120A/120B, and a second set of terminal positions 125A/125B. Terminal positions of a same set may be spaced apart from one another in the first direction. The first set of terminal positions 120A/120B and the second set of terminal positions 125A/125B may be spaced apart from each other in the second direction. In this manner, the first set of terminal positions 120A and 120B may be located in a middle portion of the top face in the second direction, and the second set of terminal positions 125A and 125B may be located in an outside portion of the top face in the second direction.

Each terminal position 120A/120B/125A/125B may correspond to a polarity of the battery and may comprise a port or input for receiving battery terminals 130A/130B that provide connection between the battery and external devices. For example, 120A may correspond to a first polarity of the battery, while 120B corresponds to a second polarity. The first polarity may be a positive or negative polarity, with the second polarity being opposite of the first polarity. In a similar fashion, 125A may correspond to a positive or negative polarity and 125B corresponds to the opposite polarity. In an embodiment, 120A and 125A provide a port or input to a positive polarity of the battery while 120B and 125B provide a port or input to a negative polarity of the battery. In some embodiments, when the inputs or ports of terminal positions are not in use, covers 140A/140B may be placed over the inputs or ports at the terminal positions for protection. For example, as depicted in FIG. 1, the second set of terminal positions 125A and 12B are not in use and are protected by covers 140A/140B.

The battery assembly 100 further comprises a handle 110 that is removably attachable to the top face 115. The handle may be capable of attaching to the top face in different positions. For example, the handle 110 may be provided and attached such that ends of the handle align with the first set of terminal positions 120A/120B. Alternatively, the handle 110 may attach such that the ends of the handle align with the second set of terminal positions 125A/125B. After attaching in one position, the handle 110 may be removed from that position and reattached at the other position.

For example, as depicted in FIG. 1, the handle 110 may initially be aligned with the first set of terminal positions 120A/120B. As will be described further below, the handle 110 may be attached to the ports or inputs of these terminal positions via battery terminals 130A and 130B. A user may later decide that, based on the surrounding circumstances, the handle 110 would be more conveniently located in an outside portion of the top face 115. As such, the user may remove the terminals 130A/130B from the inputs at 120A/120B in order to detach the handle 110 from the first position. The user may then move the handle 110 to the second position aligned with 125A/125B, and attach the handle 110 in that position.

As previously referenced, the handle 110 may be attached to the battery via battery terminals 130A/130B. These terminals act as both fasteners and as electrical connectors between the battery and external devices such as jumper cables. Each terminal position may comprise a port or input that allows the battery terminals to be in electrical connection with a pole of the battery. In an embodiment, inputs may include threaded sidewalls that mate with threaded portions of the battery terminals 130A/130B. As discussed further with respect to FIG. 5, this configuration allows a user to attach the handle by screwing the battery terminals into the inputs through an opening in the handle. The user may also unscrew the battery terminals from the inputs in order to detach the handle.

The battery assembly 100 may further comprise protective caps 135A/135B that cover exposed portions of the battery terminals 130A/130B. The caps may provide electrical insulation for the battery terminals as well as providing resistance to corrosion. The protective caps 135A/135B are removable, and may be removed from the battery terminals 130A/130B when electrical connection to or from the battery is desired. When the battery terminals 130A/130B are not in use, the protective caps 135A/135B may be placed over exposed portions of the terminals to protect against electrical shorts and against corrosion.

In other embodiments, the handle 110 may be attached to inputs of the first set of terminal positions 120A/120B or the second set of terminal positions 125A/125B via a pair of screws or standard bolts. In an embodiment, screws may be used to provide secure, removable attachment of the handle to the top face of the battery. While the screws attach the handle at one set of terminal positions, battery terminals 130A/130B may be installed at the other set of terminal positions to allow for connection between the battery and external devices.

As described further below with reference to FIGS. 9A-9C, in some embodiments, the battery assembly 100 may include four battery terminals 130. In these embodiments, the covers 140A/140B are not in place and a battery terminal 130 may be connected to inputs at each terminal position on the top face.

Figure 2A:
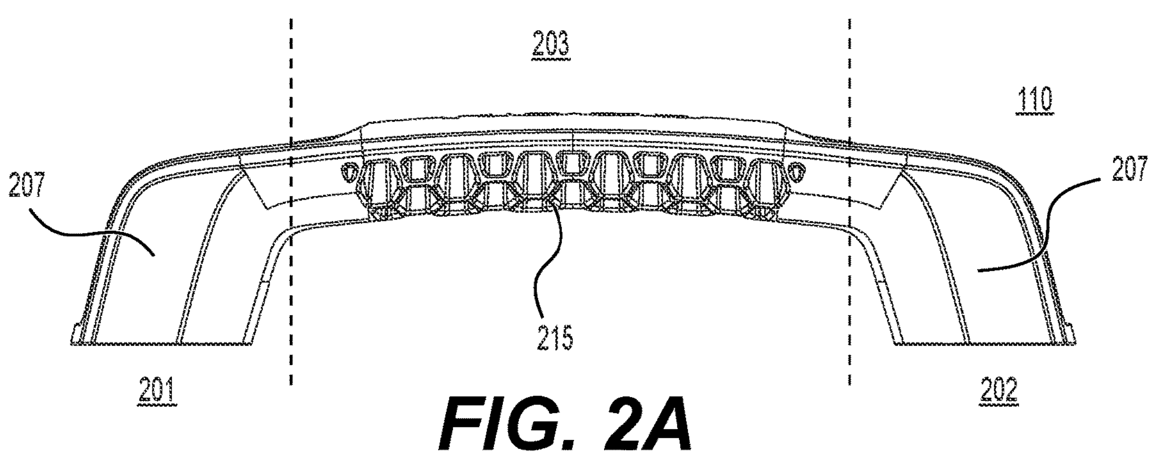
FIGS. 2A-2C are diagrams depicting various perspective views of a handle according to an embodiment.
Figure 2B:
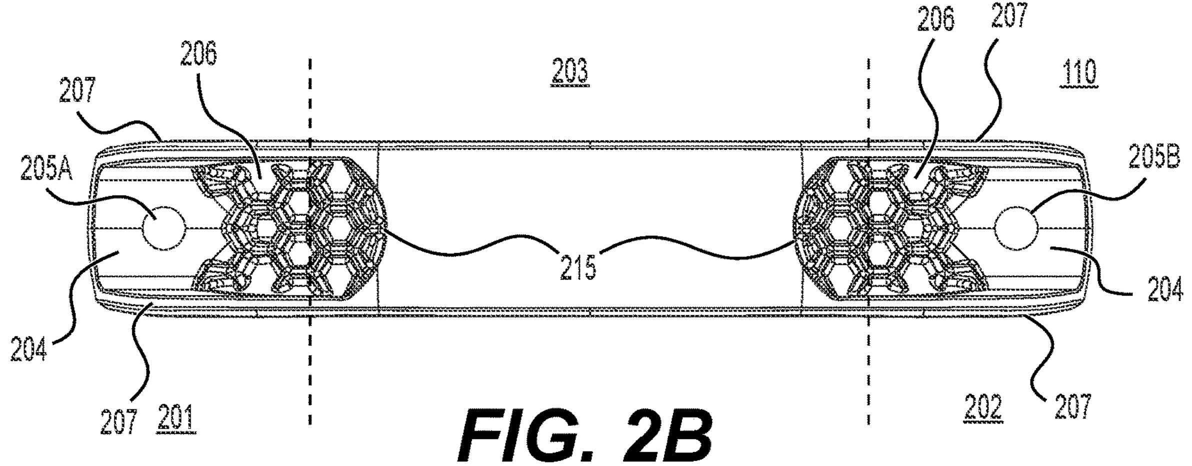
Figure 2C:
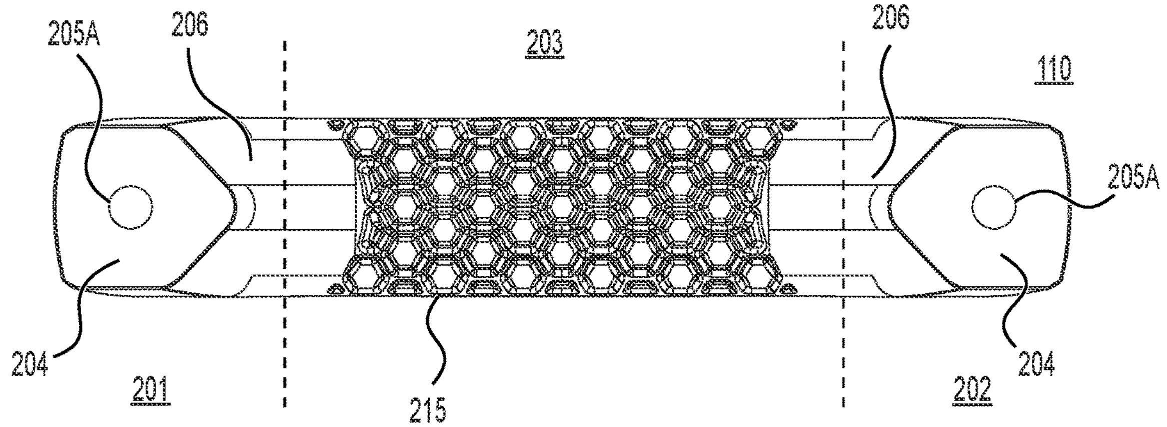

FIGS. 2A-2C are diagrams depicting various perspective views of a handle 110 according to an embodiment. FIG. 2A is a diagram depicting a side view of the handle 110 according to an embodiment. FIG. 2B is a diagram depicting a top view of the handle 110 according to an embodiment. FIG. 2C is a diagram depicting a bottom view of the handle 110 according to an embodiment.

Handle 110 may have a first end 201, a second end 202, and a grip portion 203 extending between the first end 201 and the second end 202. The grip portion 203 allows a user's hand to engage with the handle. The grip portion 203 may include a lattice structure 215. In an embodiment, handle 110 is a rigid body formed of a plastic material, however the material is not so limited. For example handle 110 may be any type of molded article, or any electrically insulative material that provides sufficient structure to support a battery. Lattice structure 215 may include areas where the material of the handle 110 is not present. This may reduce the weight of the handle, save on the cost of materials, and provide a more comfortable interface for a user to grip. In one embodiment, the lattice portion 215 may be in a honeycomb or hexagonal shape.

Each of the first end 201 and second end 202 may comprise a bottom portion 204 having a hole 205A/205B. The holes 205A/205B may provide a space for battery terminals to pass through such that the handle is securely attached to the battery when the battery terminals are screwed into inputs at the terminal positions in the top face of the battery. In an embodiment, the first end 201 may comprise first hole 205A and the second end 202 may comprise second hole 205B. In an example attachment of the handle 110 to the battery, the first hole 205A may be aligned with terminal position 120A, and the second hole 205B may be aligned with terminal position 120B. Battery terminal 130A may be screwed into the input at terminal position 120A through hole 205A. Battery terminal 130B may be screwed into the input at terminal position 120B through hole 205B. Doing so provides a sturdy attachment of handle 110 to the top face 115 of the battery while also providing external connection to both a positive and negative polarity of the battery through the battery terminals 130A/130B.

The first end 201 and second end 202 may each further comprise a pair of vertical sidewalls 207. Each end includes two vertical sidewalls 207 spaced apart in a width direction of the handle. The vertical sidewalls 207 of each end are set far enough apart from one another so as to provide enough space for the battery terminals to be fed through the holes 205A/205B and preserving a gap between the battery terminals and inner surfaces of the vertical sidewalls 207. This gap between adjacent vertical sidewalls 207 may overlap with the position of the holes 205A/205B in the bottom portion 204 such that a battery terminal may be present in a gap and threaded through the overlapping hole.

In an embodiment, a handle 110 may further comprise inclined sidewalls 206 extending from the bottom portion 204 toward the grip portion 203. In FIG. 2A, the vertical sidewalls 207 block a view of inclined sidewalls 206. FIG. 2B and FIG. 2C, however, provide a view showing the position of the inclined sidewalls 206. As seen in FIG. 2B, the bottom portions 204 may be surrounding by sidewalls on three sides. In a width direction of the handle 110, bottom portions 204 may be bordered by vertical sidewalls 207. In the direction in which the handle 110 extends, however, the bottom portion may be open on outer sides and bordered by the inclined sidewalls 206 on inner sides. The inclined sidewalls 206 may also comprise lattice structure 215. The inclined sidewalls 206, along with portions of the vertical sidewalls 207, may connect bottom portions 204 to the grip portion 203 of the handle.

Figure 3A:
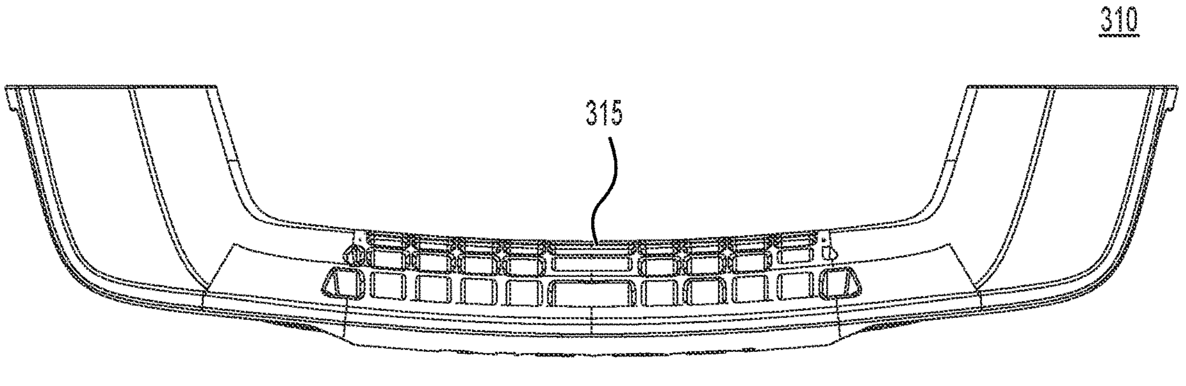
FIGS. 3A-3C are diagrams depicting various perspective views of a handle according to another embodiment.
Figure 3B:
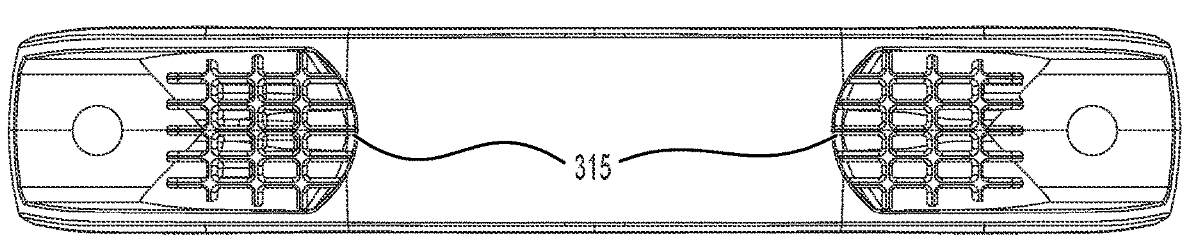
Figure 3C:
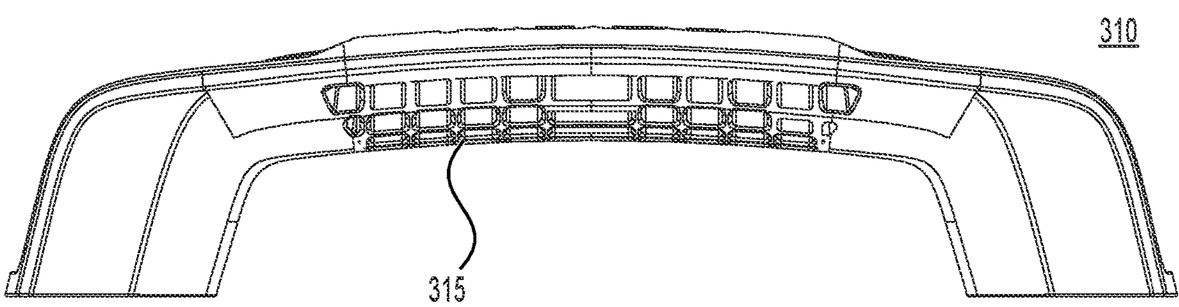

FIGS. 3A-3C are diagrams depicting various perspective views of a handle 310 according to an embodiment. FIG. 3A is a diagram depicting a side view of the handle 310 according to an embodiment. FIG. 3B is a diagram depicting a top view of the handle 310 according to an embodiment. FIG. 3C is a diagram depicting another side view of the handle 310 according to an embodiment.

The embodiment of FIGS. 3A-3C differs from the embodiment of FIGS. 2A-2C only in the shape and design of the lattice structure. Otherwise, the structures and components of the handle 310 may be the same in FIGS. 3A-3C as those depicted in the earlier figures. As such, reference numbers for identical structures are not repeated. As depicted in FIGS. 3A-3C, the handle 310 may comprise a lattice structure 315, wherein the lattice structure is in a grid shape.

Figure 4A:
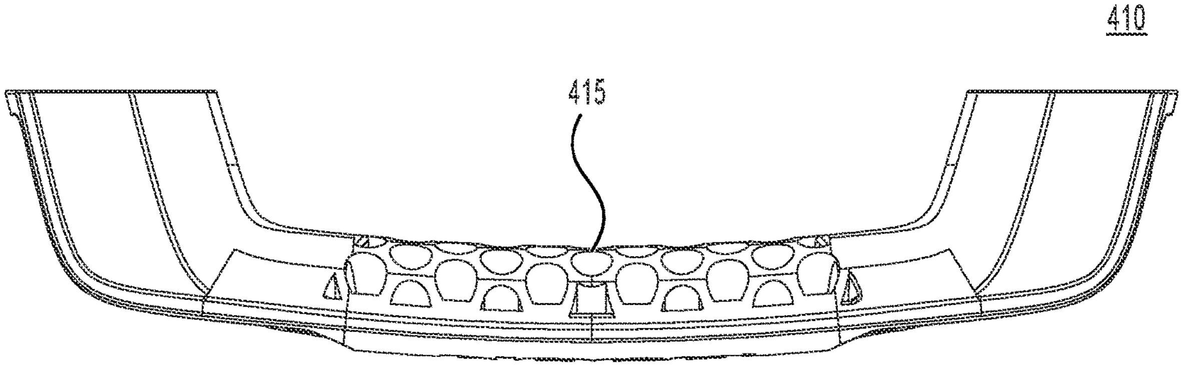
FIGS. 4A-4C are diagrams depicting various perspective views of a handle according to another embodiment.
Figure 4B:
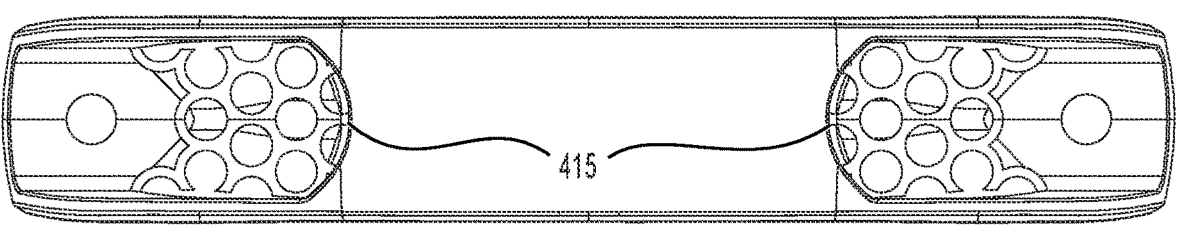
Figure 4C:
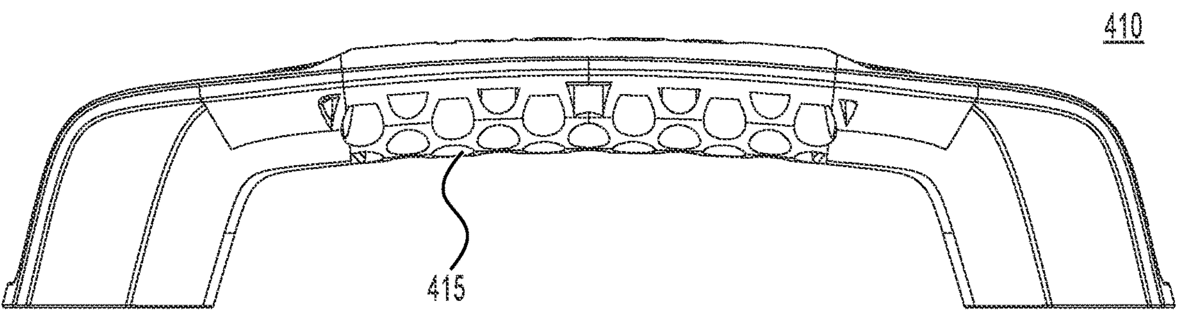

FIGS. 4A-4C are diagrams depicting various perspective views of a handle 410 according to an embodiment. FIG. 4A is a diagram depicting a side view of the handle 410 according to an embodiment. FIG. 4B is a diagram depicting a top view of the handle 410 according to an embodiment. FIG. 4C is a diagram depicting another side view of the handle 410 according to an embodiment.

The embodiment of FIGS. 4A-4C differs from the embodiment of FIGS. 2A-2C and FIGS. 3A-3C only in the shape and design of the lattice structure. Otherwise, the structures and components of the handle 410 may be the same in FIGS. 4A-4C as those depicted in the earlier figures. As such, reference numbers for identical structures are not repeated. As depicted in FIGS. 4A-4C, the handle 410 may comprise a lattice structure 415, wherein the lattice structure is in includes circular cut-outs.

Figure 5:
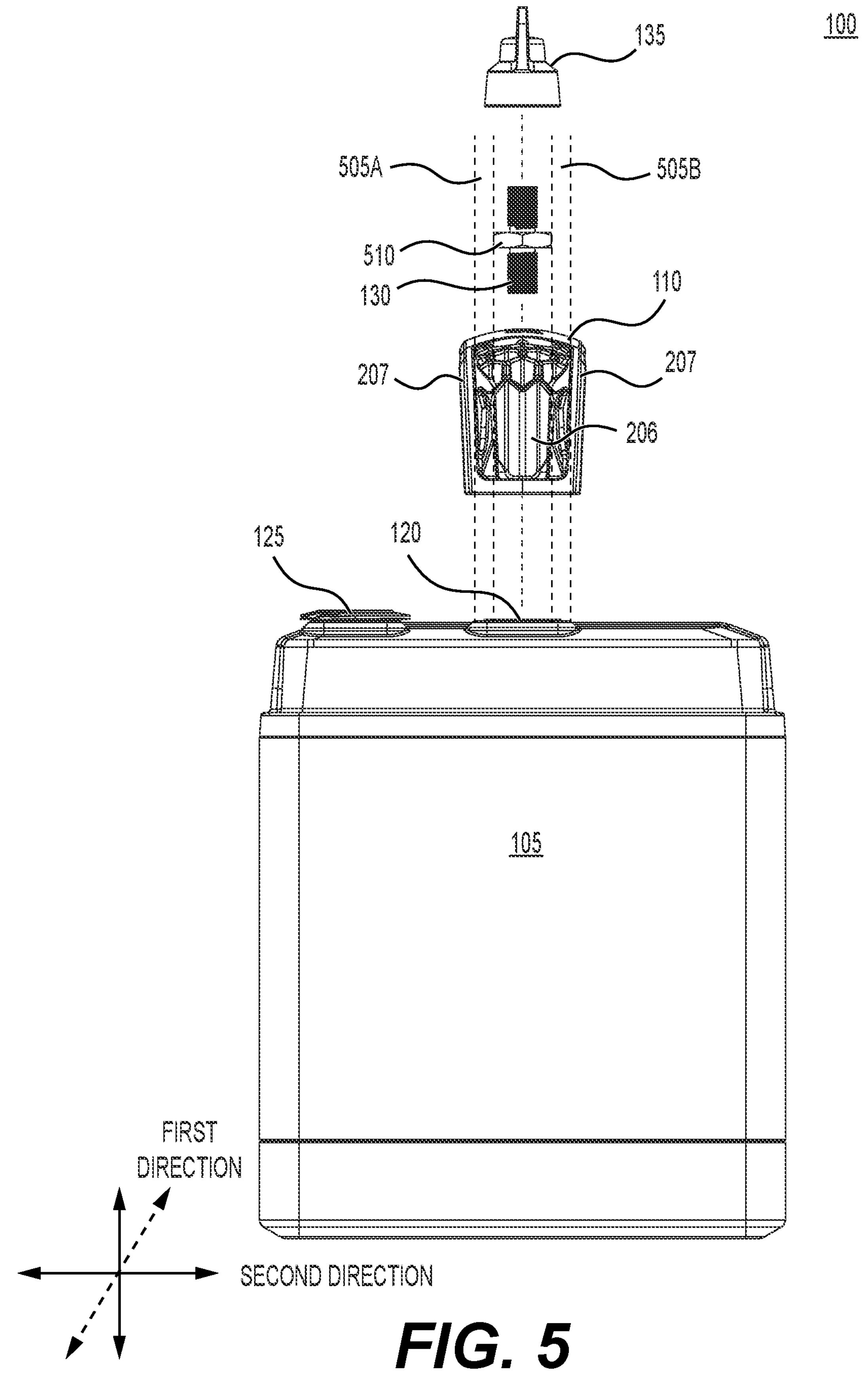
FIG. 5 is a diagram depicting a side view of a battery assembly according to an embodiment.

FIG. 5 is a diagram depicting a side view of a battery assembly 100 according to an embodiment. FIG. 5 depicts one terminal position 120 of the first set of terminal positions and one terminal position 125 of the second set of terminal positions. In an embodiment, handle 110 is configured to attach to the first set of terminal positions including terminal position 120. The handle 110 may be attached to the battery via a battery terminal 130. Battery terminal 130 may be aligned with the input of terminal position 120 such that the threaded portion of battery terminal 130 may screw into a threaded portion of the input of terminal position 120. The handle 110 may be aligned such that the hole in the bottom portion is aligned along an axis with the battery terminal 130 and the input of the terminal position 120.

When attached, the handle is sized and dimensioned such that the battery terminal 130 and terminal cap 135 may fit within the space between adjacent vertical sidewalls 107. For example, the battery terminal 130 may comprise a first threaded portion and a second threaded portion separated by a nut portion 510 in the middle. The nut portion 510 may be wider than the threaded portions. The nut portion 510 may assist in keeping a terminal cap 135 in place, but in some embodiments other shapes for the battery terminal may be used. Non-limiting examples may include a continuous threaded structure with no nut portion in the middle, or a structure that is threaded only one end.

When the handle 110 is attached, the first threaded portion may be placed through the handle and screw into the input of the terminal position 120. In this position, the battery terminal 130 and the vertical sidewalls 207 may subdivide the gap between adjacent vertical sidewalls into a pair of gaps defined between the vertical sidewalls 207 and the nut portion 510 of the battery terminal 130. A first gap 505A may be present between the nut portion 510 of the battery terminal 130 and a first vertical sidewall 207, and a second gap 505B may be present between the nut portion 510 of the battery terminal 130 and a second vertical sidewall 207.

This configuration may provide additional protection against accidental shorting of the battery terminals during storage and handling. While the gaps 505A/505B may provide enough space for the connection of external clamps or cables to the battery terminals 130 when needed, the vertical sidewalls 207 act as barriers to prevent unwanted contact with the terminal and/or clamps. Additionally, the sidewalls are set far enough apart so as to accommodate the protective caps 135 such that when the terminals are not in use, they may be covered. As such, embodiments of the present subject matter may provide two layers of protection against accidental shorting of the terminals.

Figure 6:
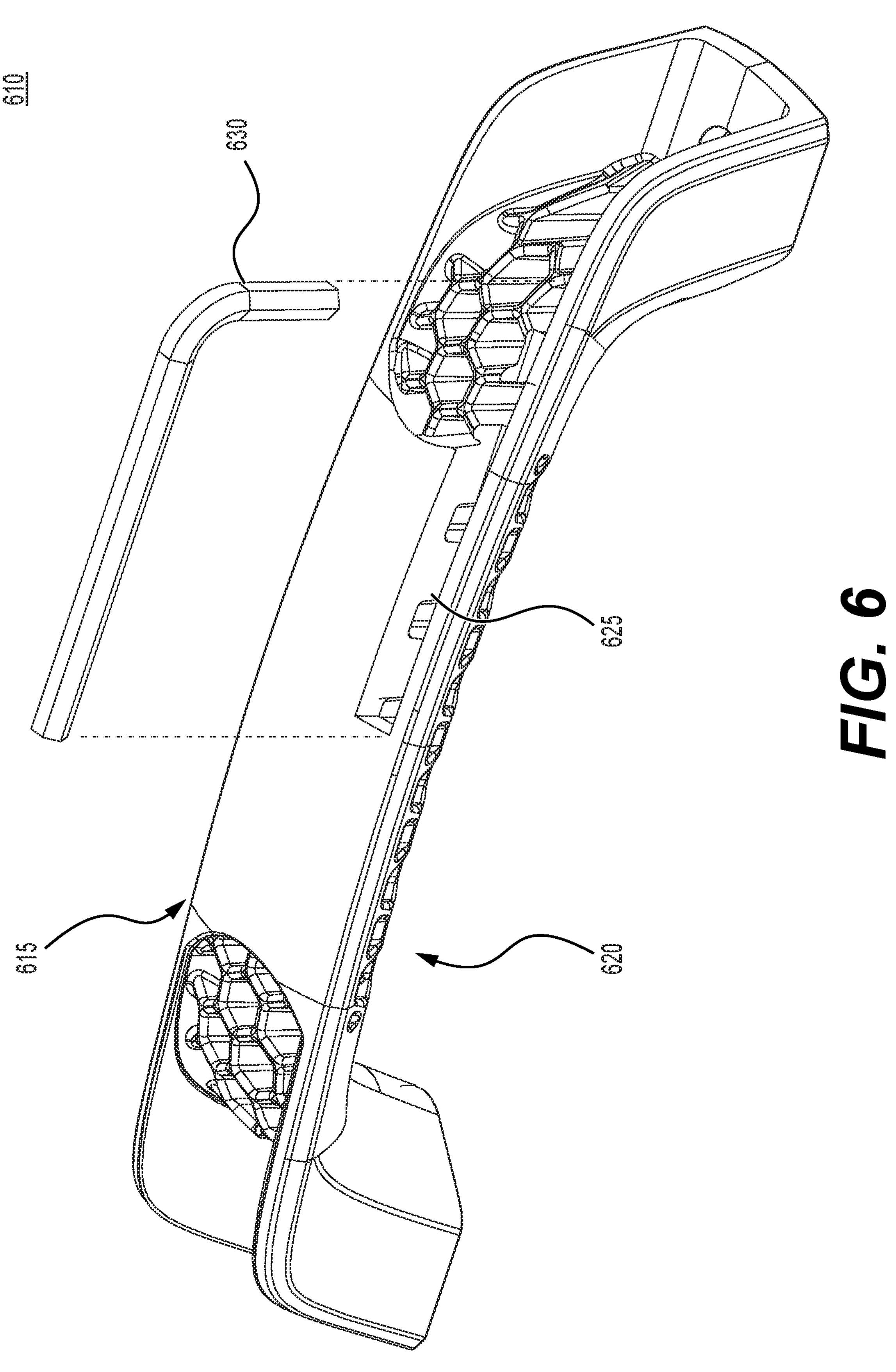
FIG. 6 is a diagram depicting a top perspective view of a handle according to an embodiment.
Figure 7:
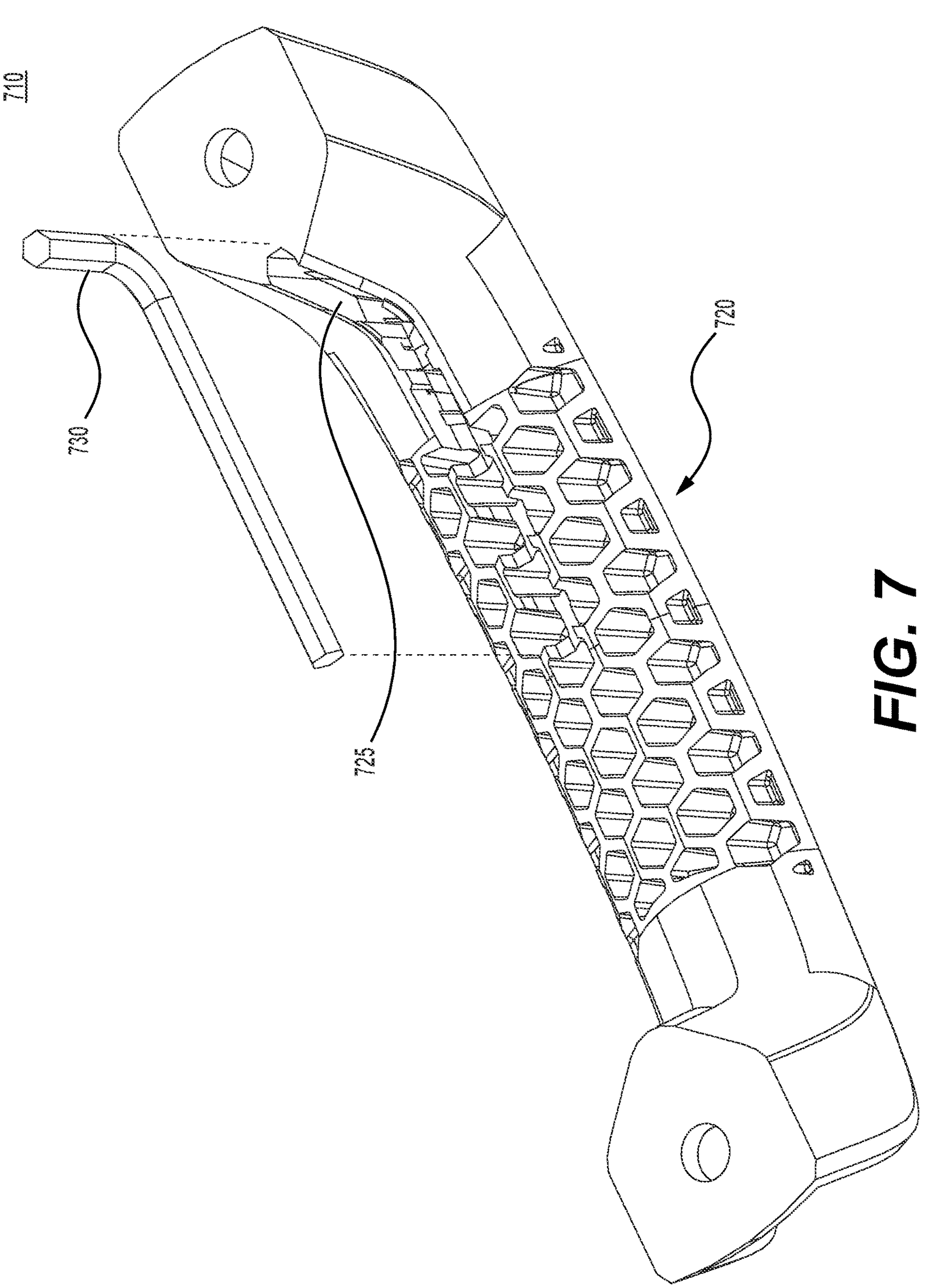
FIG. 7 is a diagram depicting a bottom perspective view of a handle according to an embodiment.
Figure 8:
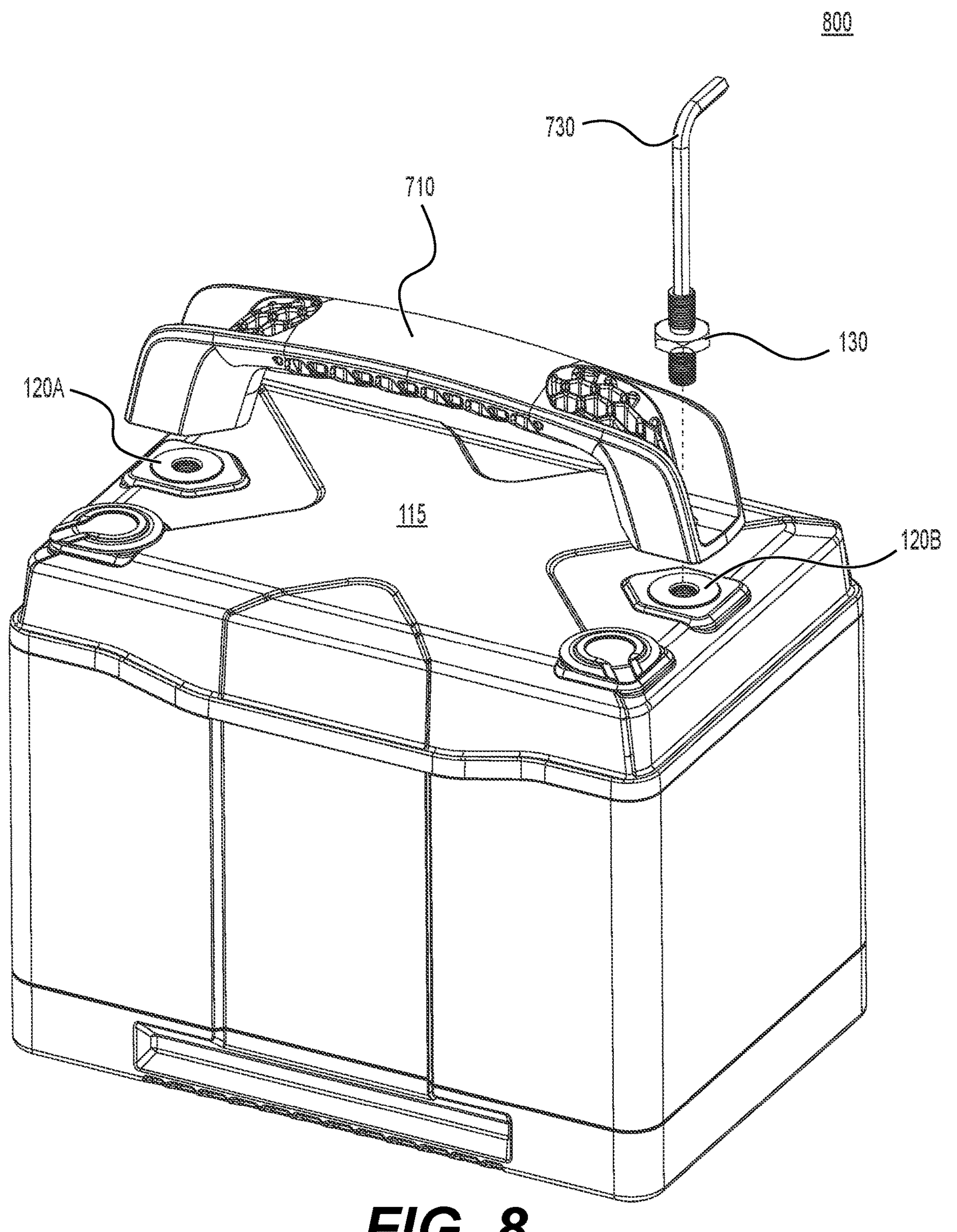
FIG. 8 is a diagram depicting a perspective view of attachment between a handle and a battery according to an embodiment.

An example mechanism for attaching the battery terminals to the battery is described hereafter with reference to FIGS. 6-8. FIG. 6 is a diagram depicting a top perspective view of a handle 610 according to an embodiment. FIG. 7 is a diagram depicting a bottom perspective view of a handle 710 according to an embodiment. FIG. 8 is a diagram depicting a perspective view of an attachment between a handle 710 and a top face of a battery 115 according to an embodiment.

As depicted in FIG. 6, in an embodiment a handle 610 may have an upper surface 615 and a lower surface 620. A recess 625 may be provided in the upper surface. The recess 625 may be sized and shaped to hold a tool. In an embodiment, the size and shape of the recess is that of a hex wrench. The handle 610 may further comprise a hex wrench 630 packaged within the recess 625. The hex wrench 630 may have end portions that match a shape of the battery terminals and may be configured to assist in attaching and detaching the handle to a battery.

FIG. 7 depicts a handle 710 according to another embodiment. Handle 710 may have an upper surface (not shown) and a lower surface 720. A recess 725 may be provided in the lower surface. The recess 725 may be sized and shaped to hold a tool. In an embodiment, the size and shape of the recess is that of a hex wrench. The handle 710 may further comprise a hex wrench 730 packaged within the recess 725. The hex wrench 730 may have end portions that match a shape of the battery terminals and may be configured to assist in attaching and detaching the handle to a battery.

FIG. 8 depicts a battery assembly 800 and the attachment of handle 710 to the top face of a battery 115 by using the hex wrench 730. As seen in FIG. 8, the handle 710 may be aligned with the first set of terminal positions 120A/120B as described previously with respect to FIG. 1, for example. A battery terminal 130 may be provided to securely, and removably, attach the handle to the battery. Hex wrench 730, previously housed within a recess on the underside of handle 710, may be used to screw the battery terminal 130 into the input at terminal position 120B. Although FIG. 8 depicts attachment via hex wrench 730, the present subject matter is not so limited. For example, the battery terminals may be screwed in using a standard wrench, or any other means capable of securely attaching the battery terminals to the inputs of the terminal positions. Additionally, as previously described, in other embodiments the handle may be attached via screws. In such a configuration, a standard screwdriver may be used to attach the screws to the inputs of the terminal positions, thereby securely and removably attaching the handle to the battery.

While FIG. 8, and other figures, depict attachment of the handle to the first set of terminal positions 120A/120B, the present subject matter is directed to a handle that may be attached in multiple positions including a position corresponding to the second set of terminal positions 125A/125B. This versatility allows for convenient placement of the handle depending on the circumstances of the battery's location.

Figure 9A:
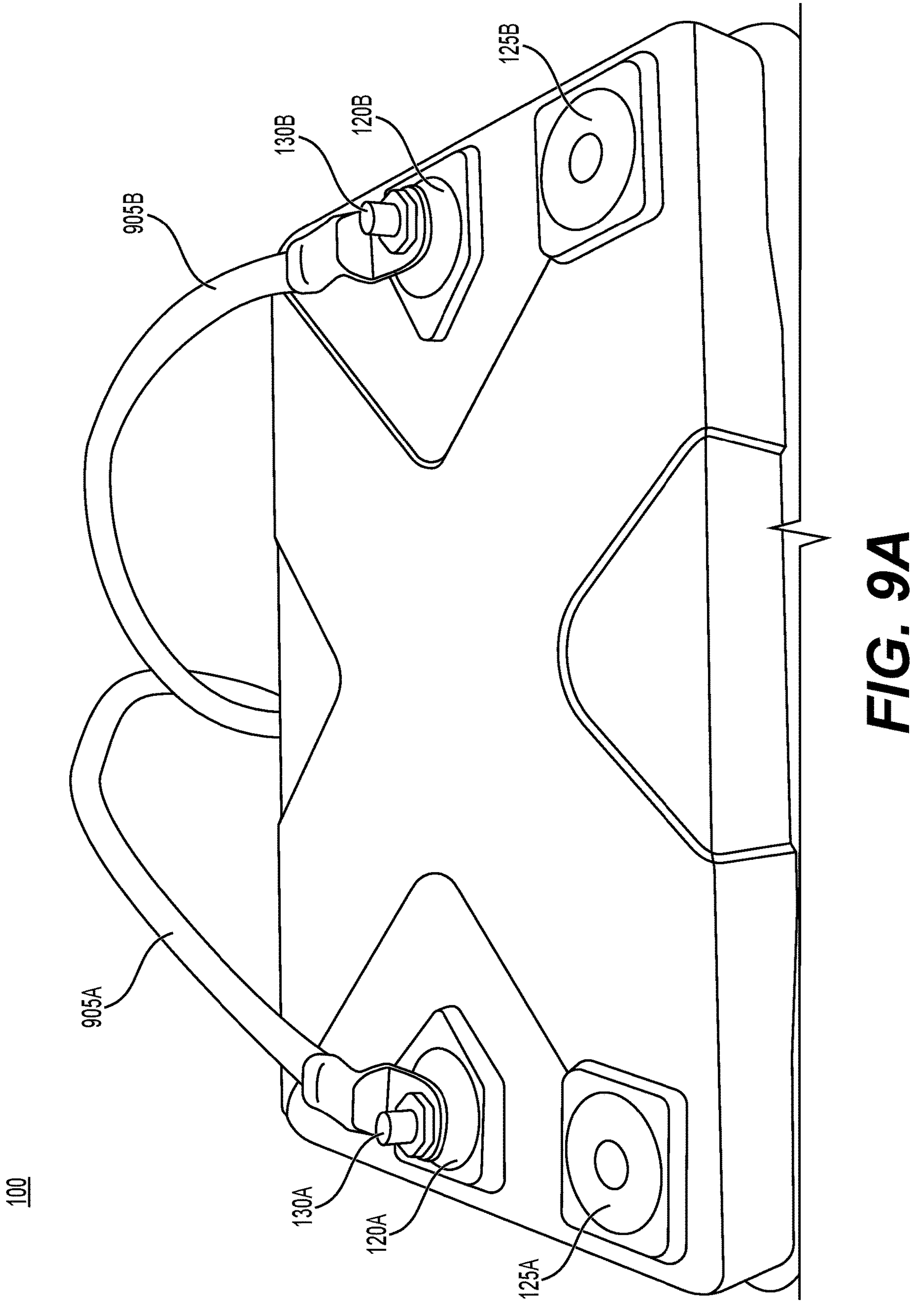
FIGS. 9A-9C are diagrams depicting perspective views of a battery assembly according to an embodiment.
Figure 9B:
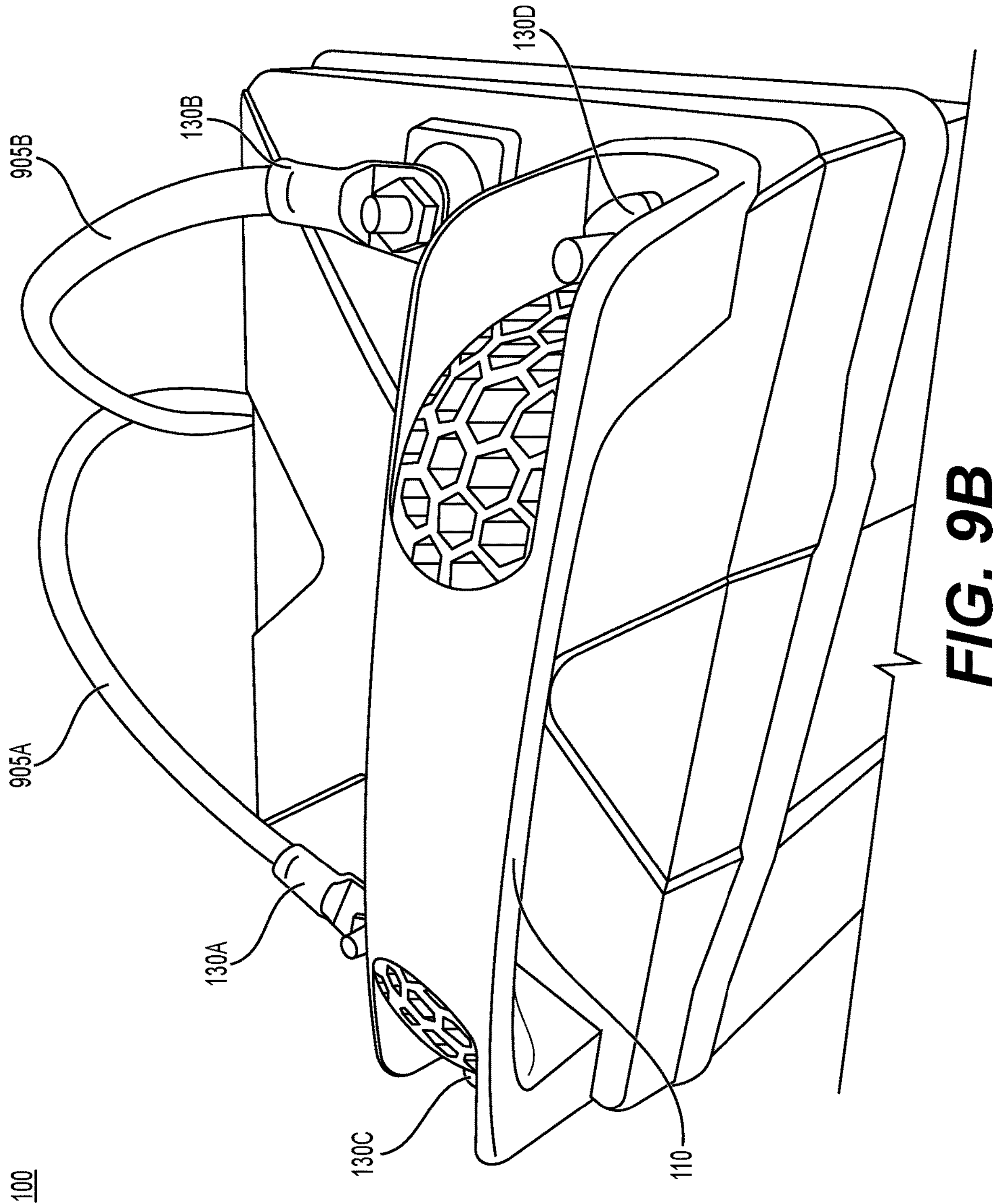
Figure 9C:
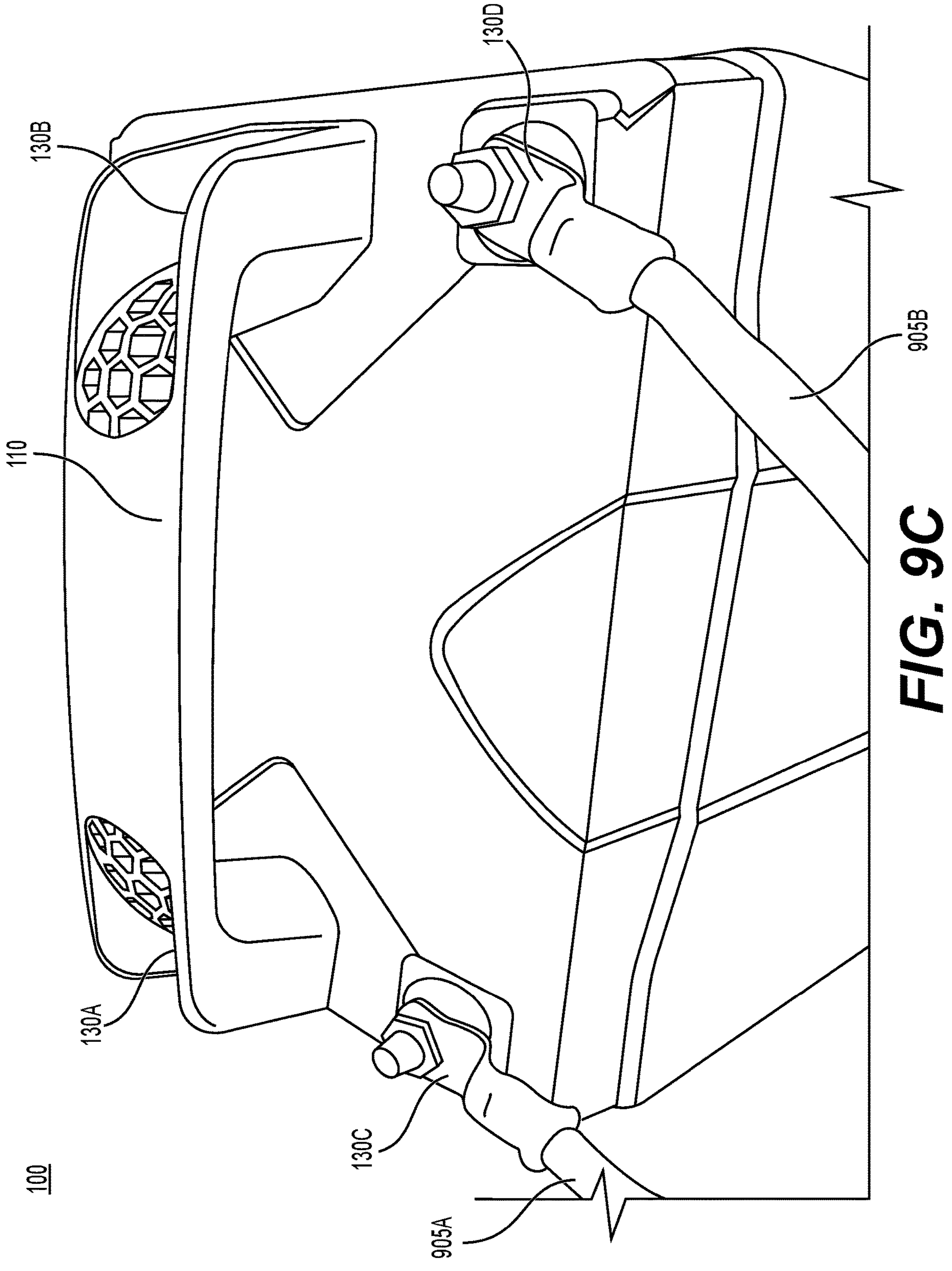

FIGS. 9A-9C are diagrams depicting perspective views of battery assembly 100 according to an embodiment. In an embodiment, inputs at terminal positions 120A/120B as well as those at 125A/125B are uncovered and are configured to receive a battery terminal of a plurality of battery terminals. The battery assembly 100 may include four battery terminals, 130A/130B as previously described above as well as battery terminals 130C and 130D.

FIG. 9A depicts a first configuration in which the handle is removed completely from the battery. In certain scenarios, a user may find that removal of the battery provides easier access to the battery terminals. For example, in an embodiment, the battery may be lithium ion battery used to power a vehicle or craft. After using the handle to maneuver the battery into place within the vehicle or craft, the user may find it advantageous to remove the handle completely from the top face of the battery in order to expose a greater portion of the top face. This may also allow room for the installation of a battery cover, or a battery bracket used to retain the battery.

As seen in FIG. 9A, after removing the handle, the user may then screw the battery terminals 130A/130B back into the inputs at first terminal positions 120A/120B so as to provide for external connection to the battery. In an embodiment, the battery terminals 130A/130B may be connected to external cables 905A/905B. This may allow for the battery to provide electricity to an external device, or to receive a supply of electricity (for example, allowing the battery to be charged). Alternatively (not shown in FIG. 9A), the battery terminals 130A/130B may be installed at second terminal positions 125A/125B. Additionally (not shown in FIG. 9A), battery terminals 130C/130D may be installed at terminal positions 125A/125B while battery terminals 130A/130B are installed at positions 120A/120B. This allows for flexibility of positioning when making a connection to external devices.

FIG. 9B depicts another configuration in which the handle 110 is attached at the second set of terminal positions 125A/125B at an outside portion of the top face of the battery. In some scenarios, a user may find that the most accessible way to maneuver the battery will require attachment to the outside portion of the top face of the battery. For example, installation of a battery in a vehicle or craft may make the middle portion of the battery inaccessible. In such a situation, if a user wants to remove or otherwise maneuver the battery, it may be easier to attach the handle to a more accessible outside portion.

As shown in FIG. 9B, handles and battery assemblies of the present subject matter accomplish such an attachment, wherein battery terminals 130C/130D may be used to attach handle 110 to inputs of the second set of terminal positions 125A/125B while battery terminals 130A/130B are attached at the first set of terminal positions 120A/120B. Battery terminals 130A/130B may further be connected to external cables 905A/905B. In this configuration, the external cables 905A/905B may easily attach to battery terminals 130A/130B while the handle 110 is still attached to the top face of the battery. At the same time, handle 110 protects against shorting of the terminals 130C/130D. Alternatively, the handle 110 may be attached via a pair of screws instead of battery terminals 130C/130D. This configuration may also allow for secure and removable attachment of the handle to the battery, while providing easy access to battery terminals 130A/130B for external connection.

FIG. 9C depicts another configuration in which the handle 110 is attached at the first set of terminal positions 120A/120B. In this configuration, a user may find that the handle is more conveniently attached over a middle portion of the top face, and connection to external cables may be more convenient at terminals on an outside portion of the top face.

As shown in FIG. 9C, this may be accomplished by attaching the handle 110 to the middle portion via battery terminals 130A/130B that are connected to inputs at the first set of terminal positions 120A/120B. Terminals 130C/130D may be connected to inputs at the second set of terminal positions 125A/125B. External cables 905A/905B may then be easily connected to battery terminals 130C/130D, while the handle 110 protects against shorting of terminals 130A/130B. Alternatively, the handle 110 may be attached via a pair of screws instead of battery terminals 130A/130B. This configuration may also allow for secure and removable attachment of the handle to the battery, while providing easy access to battery terminals 130C/130D for external connection.

Figure 10:
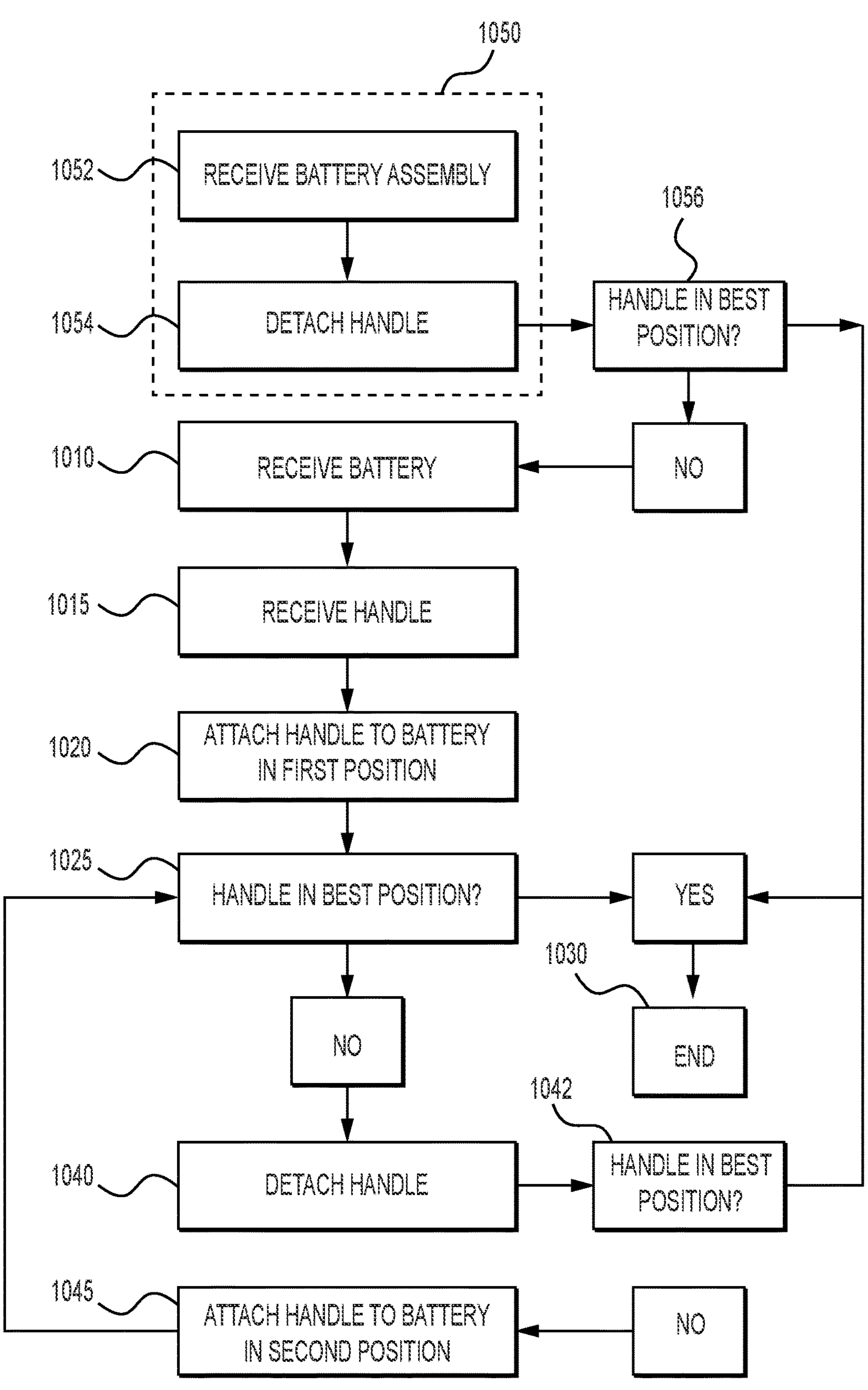
FIG. 10 is a flowchart depicting a method of assembling a battery including a handle according to an embodiment.

FIG. 10 is a flowchart depicting a method of assembling a battery including a handle according to an embodiment. An example method may begin at 1010 wherein an installer receives a battery. The received battery may be the same as that depicted in FIG. 1, however the battery may not have a handle and battery terminals installed. The battery may comprise a top face having multiple positions for battery attachment. For example, the battery may comprise a first set of terminal positions disposed in a middle portion of the top face and a second set of terminal positions disposed in an outer portion of the top face, as shown and described previously with respect to FIG. 1. The method may proceed at 1015 wherein an installer receives a handle. Like the battery, the handle may be the as that depicted in FIG. 1, however the handle is not attached to the battery.

At 1020, the installer may attach the handle to the battery in a first position. The first position may correspond to the first set of terminal positions or to the second set of terminal positions. The attachment may be achieved via a plurality of battery terminals. For example, the handle may have a first end including a bottom portion with a first hole and a second end including a bottom portion with a second hole. The first set of terminal positions and the second set of terminal positions may comprise threaded inputs that correspond to threaded portions of the plurality of battery terminals. Attaching the handle to the battery may comprise aligning the first and second holes of the handle with the inputs of the first or second set of terminal positions and screwing the plurality of battery terminals into the inputs through the holes of the handle.

At 1025, the installer may assess whether the handle is in the best position. In some circumstances, it may be more convenient to engage with the battery via a handle in the middle portion of the battery, while in others it may be more convenient to engage with the battery via a handle disposed at an outside portion of the battery. If the installer determines the first position is best position, the method may proceed to 1030 and the method may end. If, however, the installer determines that the first position is not the best position for the handle, the method proceeds to 1040.

At 1040, the installer may detach the handle from the battery. This may be accomplished by unscrewing the battery terminals from the threaded inputs and removing the handle from the top face of the battery. At this point, the installer may again assess whether the handle is in the best position, as shown at 1042. As previously described, there may be circumstances in which the installer may want to have the handle completely removed and the top face of the battery exposed. If the installer decides a removed handle is best, the method proceeds to completion at 1030.

If, however, the installer does not consider this to be the best configuration under the circumstances, the method may proceed to 1045, and the installer may then reattach the handle in a second position corresponding to the set of terminals over which the handle was not previously aligned.

This attachment may be accomplished through the same mechanism described above with respect to 1020.

After attaching the handle in the second position, the method returns to 1025 and the installer again assesses whether the handle is in the best position. If yes, the method proceeds to end at 1030. If no, the handle is again detached in 1040 and reattached at a different position in 1050. Once the installer has determined the handle is in the best position, the method ends.

In some embodiments, the battery and handle may come fully assembled with the handle installed at a position. In such a scenario, the method may begin with the processes shown in 1050. First, at 1052, the installer may receive a fully assembled battery, including a handle attached to the top face of the battery. The installer may then, at 1054, detach the handle and begin the process of selecting a best position for the handle. For example, after detaching the handle, the installer may then, at 1056, consider whether the best configuration is for the handle to the be removed. If so, the method may proceed to 1030 and the process may end. If, however, the installer believes the handle should be attached, the installer may proceed to 1010 and perform the steps as described above.

The foregoing description of various embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated.

The invention claimed is:

1. A handle for a battery comprising:

a body comprising a first end, a second end opposite the first end, and a grip portion extending between the first end and the second end in a first direction, wherein the body is removably attachable to the battery via at least one battery terminal, and the at least one battery terminal is configured to be in electrical connection with the battery, the at least one battery terminal comprising:

a first threaded portion configured to interface with a threaded sidewall of a battery terminal input of the battery;

a second threaded portion separate from the first threaded portion; and a central nut portion separating the first threaded portion from the second threaded portion, the central nut portion having a wider width than the first threaded portion and the second threaded portion, the body being configured to secure to the battery between the battery terminal input and the central nut portion;

wherein the at least one battery terminal is configured to receive a protective cap configured to cover the second threaded portion and the central nut portion.

2. The handle of claim 1, wherein the at least one battery terminal comprises a plurality of terminals including a first terminal and a second terminal, the first terminal is configured to connect to a first polarity of the battery through the first end of the body; and the second terminal is configured to connect to a second polarity of the battery through the second end of the body.

3. The handle of claim 2, wherein the first end and the second end each comprise a bottom portion having a hole; and the hole is configured to receive a terminal of the plurality of terminals.

4. The handle of claim 3, wherein the bottom portions extend in the first direction and in a second direction perpendicular to the first direction; and the first end and the second end each further comprise a first vertical extension and a second vertical extension spaced apart from the first vertical extension in the second direction by a gap, wherein the hole overlaps the gap.

5. The handle of claim 4, wherein the second threaded portion is configured to connect to an external module and extends vertically from the first threaded portion, and wherein a first portion of the gap separates the first vertical extension and the second portion of the terminals, and a second portion of the gap separates the second vertical extension and the second portion of the terminals.

6. The handle of claim 2, wherein the body comprises a recess shaped and sized to store a tool.

7. The handle of claim 6, further comprising a tool within the recess, the tool comprising a wrench configured to attach and detach the plurality of terminals and the battery.

8. The handle of claim 1, wherein the body comprises a rigid body.

9. A battery comprising:

a top face comprising a first set of terminal inputs and a second set of terminals inputs, the first set of terminal inputs and the second set of terminal inputs comprising threaded sidewalls;

a handle removably attached to the battery, wherein a position of the handle is adjustable such that it is attached to the first set of terminal inputs in a first position, and attached to the second set of terminal inputs in a second position, the handle configured to attach to the first set of terminal inputs or the second set of terminal inputs via a plurality of battery terminals, the plurality of battery terminals comprising:

a first threaded portion configured to interface with the threaded sidewalls;

a second threaded portion separate from the first threaded portion; and a central nut portion separating the first threaded portion from the second threaded portion, the central nut portion having a wider width than the first threaded portion and the second threaded portion, the handle removably attached to the battery between the first or second set of terminal inputs and the central nut portion; and a plurality of protective caps configured to cover the second threaded portion and the central nut portion of the plurality of battery terminals.

10. The battery of claim 9, wherein the top face extends in a first direction and a second direction perpendicular to the first direction;

the first set of terminal inputs are arranged in a middle portion of one of the first direction and the second direction; and the second set of terminal inputs are arranged in an outside portion of the one of the first direction and a second direction.

11. The battery of claim 10, wherein the handle is in the first position.

12. The battery of claim 10, wherein the handle is in the second position.

13. The battery of claim 9, wherein the handle comprises:

a first end, a second end opposite the first end, and a grip portion extending, in a first direction, between the first end and the second end;

the first end comprising a first base having a first hole, a first vertical wall, a second vertical wall separated from the first vertical wall in a second direction perpendicular to the first direction by a first gap, and a first inclined wall between the first vertical wall and the second vertical wall in the second direction and inclined towards the grip portion;

the second end comprising a second base having a second hole, a third vertical wall, a fourth vertical wall separated from the third vertical wall in the second direction a second gap, and a second inclined wall between the third vertical wall and the fourth vertical wall in the second direction and inclined towards the grip portion.

14. The handle of claim 13, wherein the first set of terminal inputs and the second set of terminal inputs are spaced apart in the second direction;

the first set of terminal inputs comprises a first positive polarity input and a first negative polarity input spaced apart in the first direction by a first distance;

the second set of terminal inputs comprises a second positive polarity terminal and a second negative polarity terminal spaced apart in the first direction by the first distance; and the first hole and the second hole of the handle are spaced apart in the first direction by the first distance.

15. A method of assembling a battery package comprising:

receiving a battery, wherein the battery comprises a top face including a first set of terminal inputs and a second set of terminal inputs, the first set of terminal inputs and the second set of terminal inputs comprising threaded sidewalls;

receiving a handle, wherein the handle is removably attachable to the battery; and attaching the handle to the battery, wherein the handle is attached to the first set of terminal positions or the second set of terminal positions via a plurality of battery terminals, the plurality of battery terminals comprising:

a first threaded portion configured to interface with the threaded sidewalls;

a second threaded portion separate from the first threaded portion; and a central nut portion separating the first threaded portion from the second threaded portion, the central nut portion having a wider width than the first threaded portion and the second threaded portion, the handle being removably attached to the battery between the first or second set of terminal inputs and the central nut portion, the battery including a plurality of protective caps configured to cover the second threaded portion and the central nut portion of the plurality of battery terminals.

* * * * *